(12) United States Patent
Sahu et al.

(10) Patent No.: US 9,055,470 B2
(45) Date of Patent: Jun. 9, 2015

(54) METHOD AND APPARATUS FOR UTILIZING THE SMART BLANKING FEATURE OF THERMAL MITIGATION

(71) Applicant: QUALCOMM Incorporated, San Diego, CA (US)

(72) Inventors: Debesh Kumar Sahu, Hyderabad (IN); Venkata Siva Prasad Gude, Hyderabad (IN); Sachin Jain, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 91 days.

(21) Appl. No.: 13/782,592

(22) Filed: Mar. 1, 2013

(65) Prior Publication Data

US 2014/0247729 A1    Sep. 4, 2014

(51) Int. Cl.
*H04W 24/04* (2009.01)
*H04W 52/02* (2009.01)

(52) U.S. Cl.
CPC .......... *H04W 24/04* (2013.01); *H04W 52/0261* (2013.01)

(58) Field of Classification Search
None
See application file for complete search history.

(56) References Cited

U.S. PATENT DOCUMENTS

| 7,860,018 | B2 | 12/2010 | Raith |
| 8,170,606 | B2 | 5/2012 | Dorsey et al. |
| 2004/0085940 | A1* | 5/2004 | Black et al. .................. 370/337 |
| 2004/0174833 | A1* | 9/2004 | Raith ............................ 370/311 |
| 2005/0101287 | A1* | 5/2005 | Jin et al. ....................... 455/404.1 |
| 2006/0182021 | A1 | 8/2006 | Kristensen et al. |
| 2007/0142058 | A1* | 6/2007 | Matsumura et al. ......... 455/452.2 |
| 2007/0173249 | A1* | 7/2007 | Ogoshi ........................ 455/423 |
| 2011/0243002 | A1 | 10/2011 | Tsuruoka |
| 2012/0075992 | A1 | 3/2012 | Shahidi et al. |
| 2012/0094714 | A1* | 4/2012 | Yoshikawa ................. 455/556.1 |
| 2012/0142394 | A1* | 6/2012 | Huan ........................... 455/522 |
| 2012/0264383 | A1* | 10/2012 | Kondo ........................ 455/127.2 |
| 2012/0266251 | A1* | 10/2012 | Birtwhistle et al. ............ 726/26 |
| 2012/0271480 | A1 | 10/2012 | Anderson et al. |
| 2013/0332720 | A1* | 12/2013 | Gupta et al. .................. 713/100 |
| 2014/0141845 | A1* | 5/2014 | Li et al. ....................... 455/573 |
| 2014/0200053 | A1* | 7/2014 | Balasubramanian et al. 455/572 |
| 2014/0226546 | A1* | 8/2014 | Gupta et al. .................. 370/311 |

FOREIGN PATENT DOCUMENTS

WO    WO 2009/143487 A2    11/2009

OTHER PUBLICATIONS

International Search Report and Written Opinion, PCT/US2014/019044, May 22, 2014, 8 Pages.

* cited by examiner

*Primary Examiner* — Otis L Thompson, Jr.
(74) *Attorney, Agent, or Firm* — Arent Fox LLP

(57) ABSTRACT

Methods and apparatus for wireless communication via a communication device (e.g., via a 1X Advanced enabled mobile device) are discussed. Embodiments can include calculating that a temperature associated with the mobile device has exceeded a thermal threshold. Aspects of the methods and apparatus include transmitting a guarantee frame, from each set of frames to be transmitted, when the temperature associated with a mobile device has exceeded the thermal threshold. Aspects of the methods and apparatus include determining that the temperature associated with a mobile device has fallen below the thermal threshold. Aspects of the methods and apparatus also include reactivating normal transmissions upon determining that the temperature associated with the mobile device has fallen below the thermal threshold. Other aspects, embodiments, and features are also claimed and described.

14 Claims, 11 Drawing Sheets

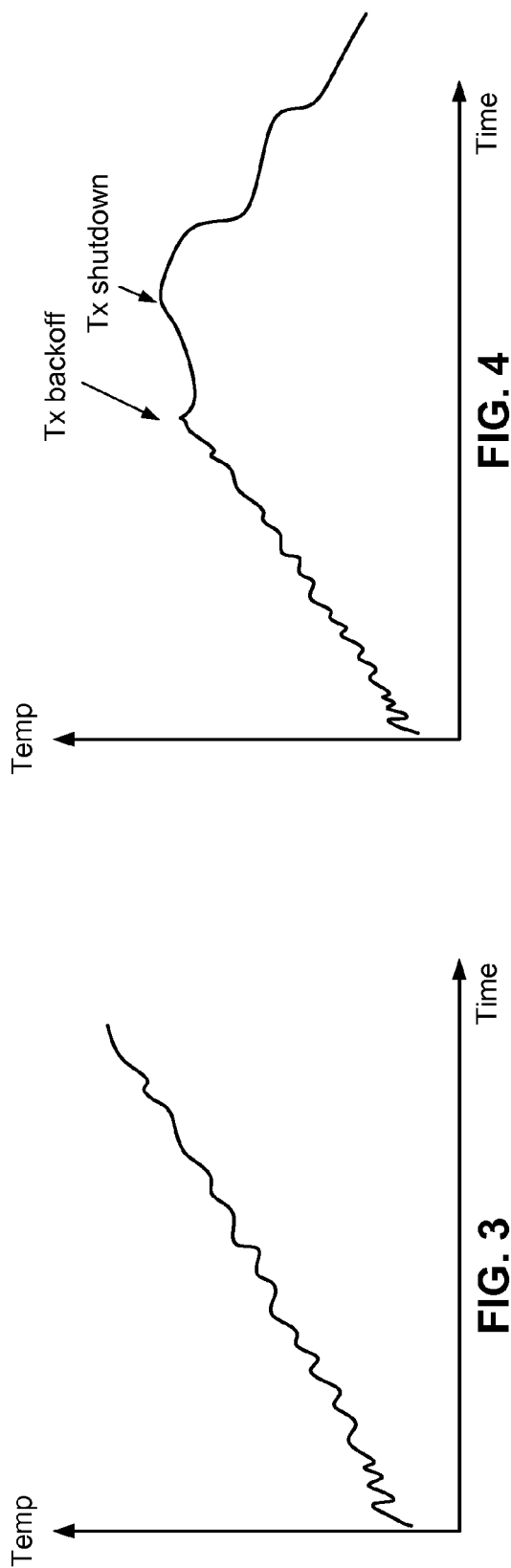

METHOD AND APPARATUS FOR UTILIZING THE SMART BLANKING FEATURE OF THERMAL MITIGATION

TECHNICAL FIELD

The technology discussed below relates generally to wireless communication systems, and more particularly, to thermal mitigation algorithms, devices, features, and systems to protect components of a wireless communication system.

BACKGROUND

Wireless communication networks are widely deployed to provide various communication services such as telephony, video, data, messaging, broadcasts, and so on. These networks are usually multiple access networks and can support communications for multiple users by sharing available network resources. One example is the UMTS Terrestrial Radio Access Network (UTRAN).

UTRAN is the radio access network (RAN) defined as a part of the Universal Mobile Telecommunications System (UMTS), a third generation (3G) mobile phone technology supported by the 3rd Generation Partnership Project (3GPP). UMTS is the successor to Global System for Mobile Communications (GSM) technologies. UMTS currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance UMTS technologies not only to meet growing demand for and to advance and enhance user experience with multimode devices. Some multimode devices, however, may exceed thermal device limits as operators utilize LTE higher data traffic rates and 1x/1xA voice communications. Simultaneous CDMA 1xA voice and SVLTE/SVDO data downloads and uploads scenarios can result in exceeding thermal limits. This can trigger a transmission power back-off followed by a RF circuitry shutdown. But this may lead to voice call drop, even if the device is 1xAdvanced capable.

BRIEF SUMMARY OF SOME SAMPLE EMBODIMENTS

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology described below is aimed at addressing the issues discussed above as well as other. The technology includes features that provide thermal mitigation to protect components of a wireless communication system. Thermal mitigation can reduce voice call drops. In some scenarios, call drops can be avoided when a wireless communication device is active in a 1x Advanced environment. In other scenarios, however, embodiments of the present invention can be implemented in various communication technologies and implemented in various components, devices, methods, and systems. Some of these are summarized below.

A method for reducing voice call drops when a wireless communication device is provided. The device can be active in a 1x Advanced environment. The method includes calculating that a temperature associated with the mobile device has exceeded a thermal threshold. Further, the method includes transmitting a guarantee frame, from each set of frames to be transmitted, when the temperature associated with the mobile device has exceeded the thermal threshold. Additionally, the method includes determining that the temperature associated with the mobile device has fallen below the thermal threshold. Still further, the method includes reactivating normal transmissions upon determining that the temperature associated with the mobile device has fallen below the thermal threshold.

In another aspect, an apparatus for reducing voice call drops when a wireless communication device is provided. The device can be active in a 1x Advanced environment. The apparatus includes a processor configured to calculate that a temperature associated with the mobile device has exceeded a thermal threshold. Further, the processor is configured to transmit a guarantee frame, from each set of frames to be transmitted, when the temperature associated with the mobile device has exceeded the thermal threshold. Additionally, the processor is configured to determine that the temperature associated with the mobile device has fallen below the thermal threshold. Still further, the processor is configured to reactivate normal transmissions upon determining that the temperature associated with the mobile device has fallen below the thermal threshold.

In another aspect, an apparatus for reducing voice call drops when a wireless communication device is provided. The device can be active in a 1x Advanced environment. The apparatus can include means for calculating that a temperature associated with the mobile device has exceeded a thermal threshold. Further, the apparatus includes means for transmitting a guarantee frame, from each set of frames to be transmitted, when the temperature associated with the mobile device has exceeded the thermal threshold. Additionally, the apparatus includes means for determining that the temperature associated with the mobile device has fallen below the thermal threshold. Still further, the apparatus includes means for reactivating normal transmissions upon determining that the temperature associated with the mobile device has fallen below the thermal threshold.

In yet another aspect, a computer-readable media for reducing voice call drops when a wireless communication device is provided. The device can be active in a 1x Advanced environment. The computer-readable media can include machine-executable code for calculating that a temperature associated with the mobile device has exceeded a thermal threshold. Further, the code may be executable for transmitting a guarantee frame, from each set of frames to be transmitted, when the temperature associated with the mobile device has exceeded the thermal threshold. Additionally, the code may be executable for determining that the temperature associated with the mobile device has fallen below the thermal threshold. Still further, the code may be executable for reactivating normal transmissions upon determining that the temperature associated with the mobile device has fallen below the thermal threshold.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 3-5 are schematic diagrams illustrating temperature profiles of a UE implementing different types of temperature mitigation algorithms according to some embodiments.

DETAILED DESCRIPTION

Figure 1:
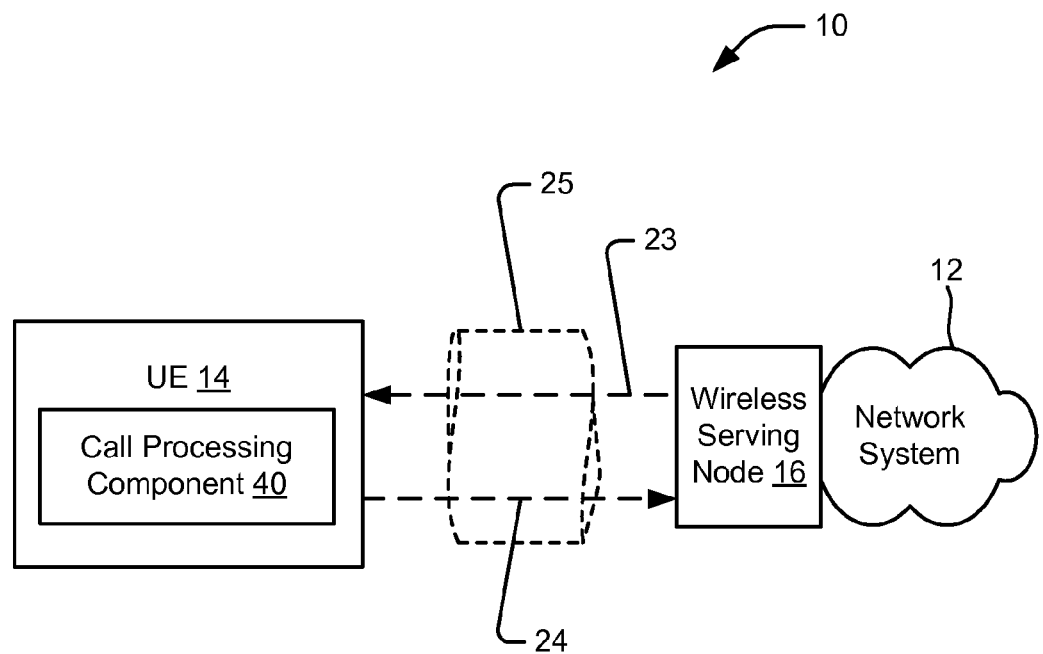
FIG. 1 is a schematic diagram illustrating an example wireless system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some multimode devices, such as Simultaneous CDMA 1x/1xA voice & LTE data (SVLTE) or Simultaneous CDMA 1x/1xA Voice & EVDO data (SVDO), may exceed the thermal limits of the of the device since the user utilizes both LTE higher data traffic rates and 1x/1xA voice communications. Consequently thermal mitigation algorithms can be triggered to reduce the device temperature.

For example, in simultaneous CDMA 1xA voice and SVLTE/SVDO data downloads and uploads scenarios, when a device exceeds the thermal limits due to higher power consumption in LTE, some thermal mitigation algorithms trigger a transmission power back-off followed by a RF circuitry shutdown. This will lead to voice call drop, even if the device is 1xAdvanced capable.

When a mobile station temperature rises over a first threshold, the mobile station will enter into a first thermal region. This can trigger a first thermal mitigation algorithm. The first thermal mitigation algorithm can back off transmission power in a mobile device. This action can reduce thermal temperature of the mobile device. If mobile station continues with operating in the first thermal region, after time (t1), the voice call of the mobile station can be dropped.

When the mobile station temperature rises over second threshold, the mobile station will enter into a second thermal region, triggering a second thermal mitigation algorithm. The second thermal mitigation algorithm consequently triggers transmission shutdown of the mobile station. If the mobile station is in the second thermal region for time (t2), the voice call will be dropped. Note, time (t1) associated with the first thermal threshold will be always greater then than time (t2) associated with the second thermal threshold.

Last, when a mobile station temperature raises over a third thermal region, the mobile station will be shut down immediately. Note, while there have only been three thermal regions described above, additional thermal regions may be introduced based on additional thermal mitigation algorithms.

Causes for thermal temperature rise of mobile devices can be many. For example, causes can include higher data rates causing an increase in transmission power, multimedia-centric features, (e.g., SVLTE, SV-DO, Wi-Fi, multicore GHz CPUs, graphics processors, and high definition video), and thinner computer board layouts.

Aspects of this apparatus and method include providing thermal mitigation algorithms to protect components of a wireless communication system. Thermal mitigation algorithms will reduce voice call drops when a wireless communication device is active in a 1x Advanced Smart Blanking environment. Preventing call drops can improve system performance in a wireless communication system.

Referring to FIG. 1, in one aspect, a wireless communication system 10 is configured to facilitate transmitting vast amount of data from a mobile device to a network at a fast data transfer rate. Wireless communication system 10 includes at least one UE 14 that may communicate wirelessly with one or more network 12 via serving nodes, including, but not limited to, wireless serving node 16 over one or more wireless link 25. The one or more wireless link 25, may include, but are not limited to, signaling radio bearers and/or data radio bearers. Wireless serving node 16 may be configured to transmit one or more signals 23 to UE 14 over the one or more wireless link 25, and/or UE 14 may transmit one or more signals 24 to wireless serving node 16. In an aspect, signal 23 and signal 24 may include, but are not limited to, one or more messages, such as transmitting a data packet from the UE 14 to the network via wireless serving node 16.

In an aspect, UE 14 may include a call processing component 40, which may be configured to transmit a data packet to the wireless serving node 16 over wireless link 25. Specifically, in an aspect, call processing component 40 of UE 14 may be configured to calculate that a temperature associated with a mobile device has exceeded a threshold, transmit a guarantee frame to the network when the mobile device has exceeded a threshold, determine that the temperature of the mobile device has fallen below the threshold, and reactivate normal transmissions with network when the temperature of the mobile device has fallen below the threshold.

UE 14 may comprise a mobile apparatus and may be referred to as such throughout the present disclosure. Such a mobile apparatus or UE 14 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 16 of wireless communication system 10, may include one or more of any type of network component, such as an access point, including a BS or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small base stations, such as, but not limited to a femtocell, picocell, microcell, or any other small base station.

Figure 2:
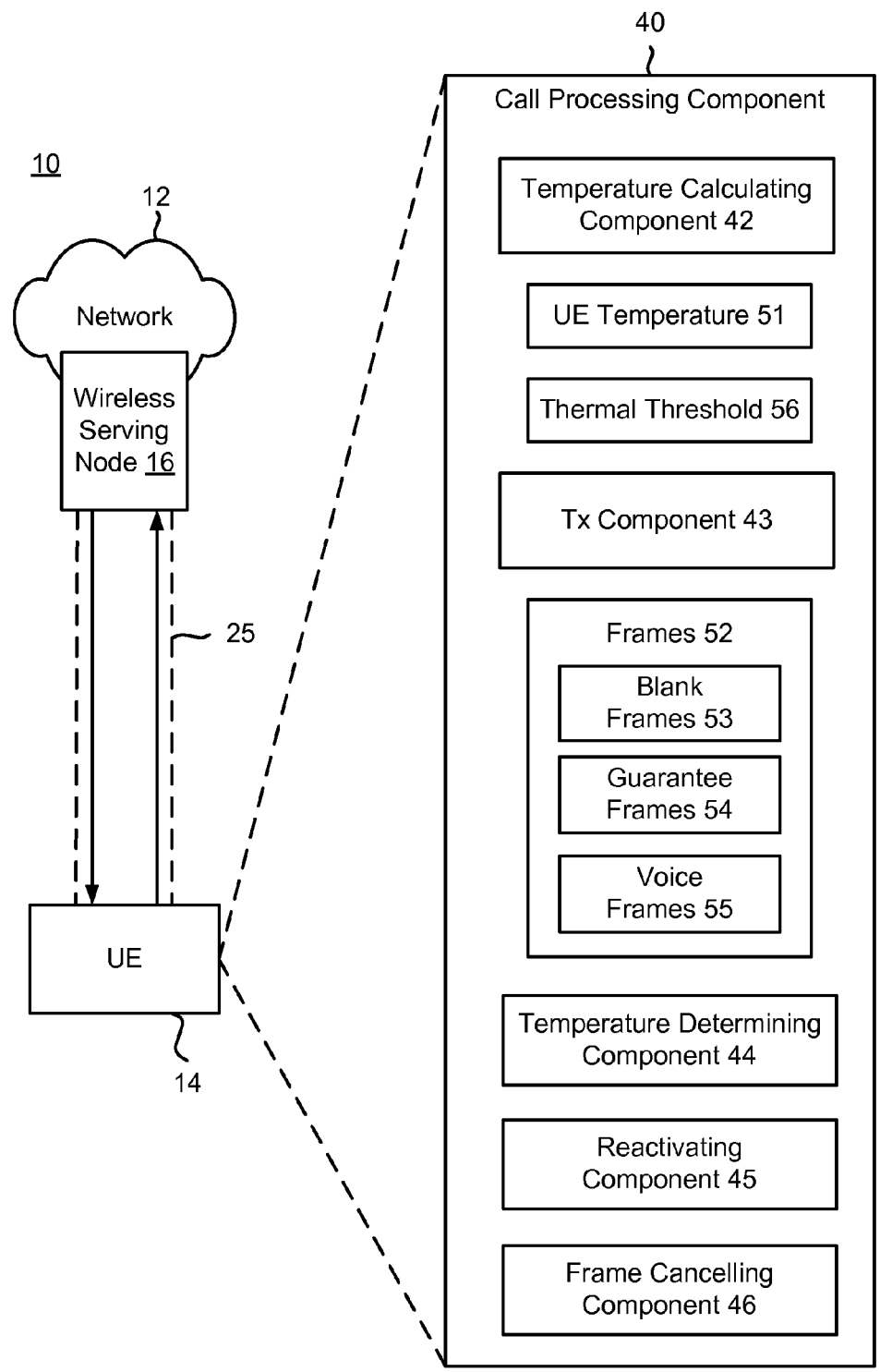
FIG. 2 is a schematic diagram illustrating exemplary aspects of call processing according to some embodiments.

Referring to FIG. 2, one aspect of the present apparatus and method is a wireless communication system 10 configured to include wireless communications between network 12 and UE 14. The wireless communications system may be configured to support communications between multiple users, and FIG. 2 illustrates a manner in which wireless serving node 16, located in network 12 communicates with UE 14. The wireless communication system 10 can be configured for downlink message transmission or uplink message transmission over wireless link 25, as represented by the up/down arrows between network 12 and UE 14.

In an aspect, UE 14 may be configured to calculate that a temperature associated with a mobile device has exceeded a threshold, transmit a guarantee frame to the network when the mobile device has exceeded a threshold, determine that the temperature of the mobile device has fallen below the threshold, and reactivate normal transmissions with network when the temperature of the mobile device has fallen below the threshold. For example, UE 14 may be configured to transmit frames 52 to network 12 via wireless serving node 16 over wireless link 25 based on the UE temperature 51.

In an aspect, within the UE 14 resides a call processing component 40. The call processing component 40 may be configured, among other things, to include a temperature calculating component 42 capable of calculating that a temperature associated with the mobile device has exceeded a thermal threshold. In other words, the temperature calculating component 42 is configured to calculate that the UE temperature 51 of UE 14 has exceeded a thermal threshold 56.

In another aspect, the call processing component 40 may also be configured to include a transmitting (Tx) component 43 capable of transmitting a guarantee frame, from each set of frames to be transmitted, when the temperature associated with the mobile device has exceeded the thermal threshold. As such, a guarantee frame is transmitted during each guarantee frame time slot, and wherein, upon transmitting a guarantee data frame, transmissions are shutdown until a next guarantee frame time slot is reached. The guarantee frame is a critical frame transmitted by the mobile device to the network.

For example, the transmitting (Tx) component 43 is configured to transmit guarantee frames 54, from among frames 52, to network 12 via wireless serving node 16 over link 25, when the UE temperature 51 of UE 14 has exceeded the thermal threshold 56. Additionally, the UE 14 stops transmitting blank frames 53 from among frames 52 to network 12 via wireless serving node 16 over link 25, when the UE temperature 51 of UE 14 has exceeded the thermal threshold 56. Also, when the UE temperature 51 associated with the mobile device has exceeded the thermal threshold 56, forward link Frame Early Termination (FET) is ignored since there is no transmission of blank frames 53 and voice frames 55.

As stated above, when a device exceeds a thermal limit or thermal threshold due to higher power consumption in LTE during simultaneous CDMA 1xA voice and SVLTE/SVDO data downloads, some thermal mitigation algorithms trigger a transmission (Tx) power back-off followed by a RF circuitry shutdown. However, the call processing component 40 of UE 14 stops transmitting the blank frames 53 and only transmits the guarantee frames 54. In other words, after transmitting a guarantee data frame, the call processing component 40 shuts down transmission until the next guarantee data frame. As such, since the guarantee frames 54 are transmitted periodically, the temperature of UE 14 decreases avoiding UE call drops.

Moreover, when the call processing component 40 stops transmitting blank frames 53 and the transmitting (Tx) component 43 transmits only guarantee frames 54, the CDMA 1xA data transmission is switched on so that the traffic call will continue.

It should also be noted that the above step of transmitting a guarantee frame to the network when the mobile device has exceeded a threshold continue until the thermal conditions of the mobile device normalize. Indeed, once the thermal conditions are back to normal, as discussed below, all frames 52 may be transmitted from UE 14 to network 12 via wireless serving node 16 over link 25.

Additionally, the call processing component 40 may be configured to include a temperature determining component 44 capable for determining that the temperature associated with the mobile device has fallen below the thermal threshold. For example, temperature determining component 44 is configured to determine that the UE temperature 51 of UE 14 has fallen below the thermal threshold 56.

In another aspect the call processing component 40 is configured to include a reactivating component 45 capable of reactivating normal transmissions upon determining that the temperature associated with the mobile device has fallen below the thermal threshold. For example, the reactivating component 45 is configured to reactivate normal transmission of frames 52, which includes blank frames 53, guarantee frames, and voice frames 55, from UE 14 to network 12 via wireless serving node 16 over link 25.

Indeed, after the temperature determining component 44 determines the UE temperature 51 of UE 14 has fallen below the thermal threshold 56, the reactivating component 45 is configured to reactivate normal transmission of frames 52 from UE 14 to network 12 via wireless serving node 16 over link 25.

In yet another aspect, the call processing component 40 is configured to include a frame cancelling component 46 capable of canceling the transmission of voice frames prior to transmitting the guarantee frame. For example, the frame cancelling component 46 is configured to cancel the transmission of voice frames 55, prior to transmitting the guarantee frames 54, from UE 14 to network 12 via wireless serving node 16 over link 25.

FIGS. 3-5 are schematic diagrams illustrating temperature profiles of a UE implementing different types of temperature mitigation algorithms. Specifically, FIG. 3 illustrates a mobile device temperature graph associated with no thermal mitigation algorithms. With this type of configuration, parts of a mobile device may fail or become corrupted at high temperatures.

FIG. 4 illustrates a mobile device temperature graph associated with mitigation algorithms of transmission back off and transmission shutdown. With this type of configuration, the temperature of the mobile may be able to be controlled but calls may be dropped.

FIG. 5 discloses an aspect of the workings of the present apparatus and method. Specifically, FIG. 5 illustrates a mobile device temperature graph associated configured to utilize smart blanking, thereby transmitting only guarantee frames during the guarantee frame time slot and shutdown the transmission of blank or voice frames until reaching next guarantee frame slot. Consequently, the mobile station and the base station maintain a call link. For example, UE 14, employing smart blanking, transmits only guarantee frames 54, from among the frames 52, to network 12 via wireless serving node 16 over link 25, maintaining the call link. Furthermore, UE 14 does not transmit blank frames 53 or voice frames 55, from among frames 52, to network 12 via wireless serving node 16 over link 25.

Figure 6:
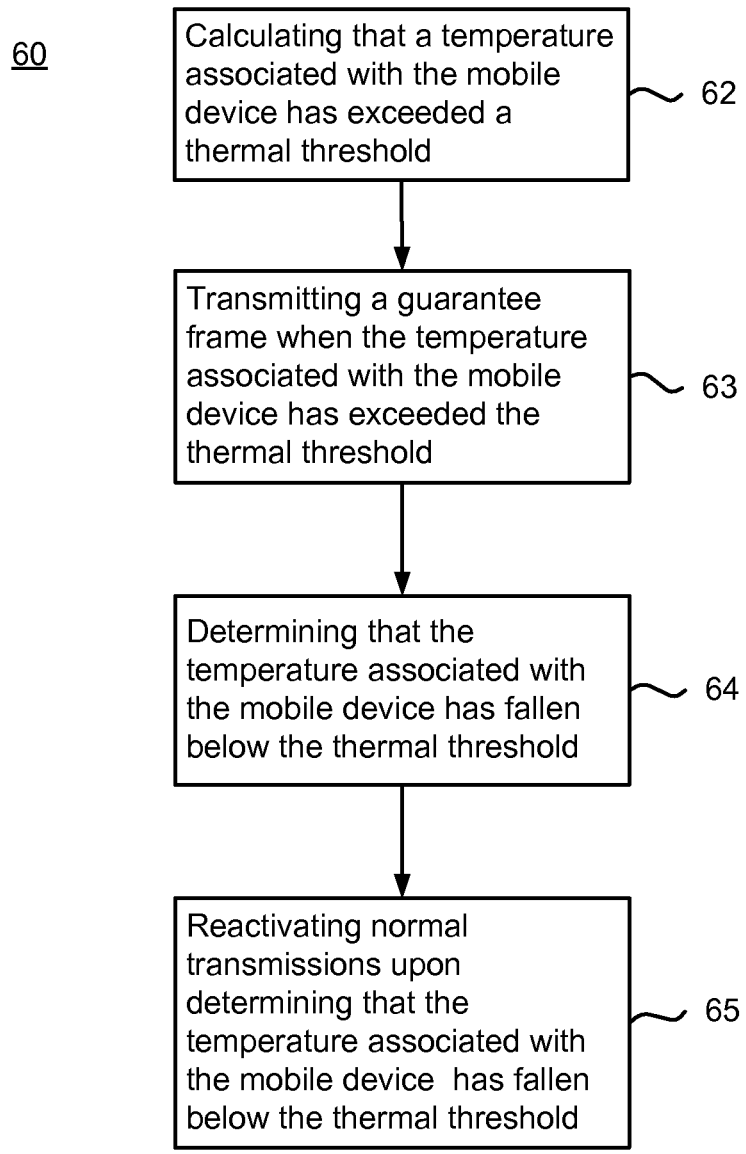
FIG. 6 is a flow diagram illustrating an exemplary method for call processing in a wireless communication system according to some embodiments.

FIG. 6 is a flow diagram illustrating an exemplary method 60. In an aspect, method 60 may be performed by a UE (e.g., UE 14 of FIG. 2), and may be performed by a processor or other component capable of executing computer-executable instructions for performing the steps of FIG. 6. In some examples, method 60 may include a UE with a call processing component 40 that may be configured to calculate that a temperature associated with a mobile device has exceeded a threshold, transmit a guarantee frame to the network when the mobile device has exceeded a threshold, determine that the temperature of the mobile device has fallen below the threshold, and reactivate normal transmissions with network when the temperature of the mobile device has fallen below the threshold.

At 62, the UE is configured for calculating that a temperature associated with the mobile device has exceeded a thermal threshold. For example, temperature calculating component 42, residing in call processing component 40, may be configured to execute instructions for calculating that the UE temperature 51 of UE 14 has exceeded a thermal threshold 56.

At 63, the UE is configured for transmitting a guarantee frame when the temperature associated with the mobile device has exceeded the thermal threshold. For example, transmitting (Tx) component 43, residing in call processing component 40, may be configured to execute instructions for transmitting guarantee frames 54, from among frames 52, to network 12 via wireless serving node 16 over link 25, when the UE temperature 51 of UE 14 has exceeded the thermal threshold 56.

At 64, the UE is configured for determining that the temperature associated with the mobile device has fallen below the thermal threshold. For example, temperature determining component 44, residing in call processing component 40, may be configured to execute instructions for determining that the UE temperature 51 of UE 14 has fallen below the thermal threshold 56.

At 65, the UE is configured for reactivating normal transmissions upon determining that the temperature associated with the mobile device has fallen below the thermal threshold. For example, reactivating component 45, residing in call processing component 40, may be configured to execute instructions for reactivating normal transmission of frames 52, which includes blank frames 53, guarantee frames, and voice frames 55, from UE 14 to network 12 via wireless serving node 16 over link 25.

In an aspect, for example, the executing method 560 may be UE 14 or network 12 (FIG. 1) executing the call processing component 40 (FIG. 1), or respective components thereof.

Figure 7:
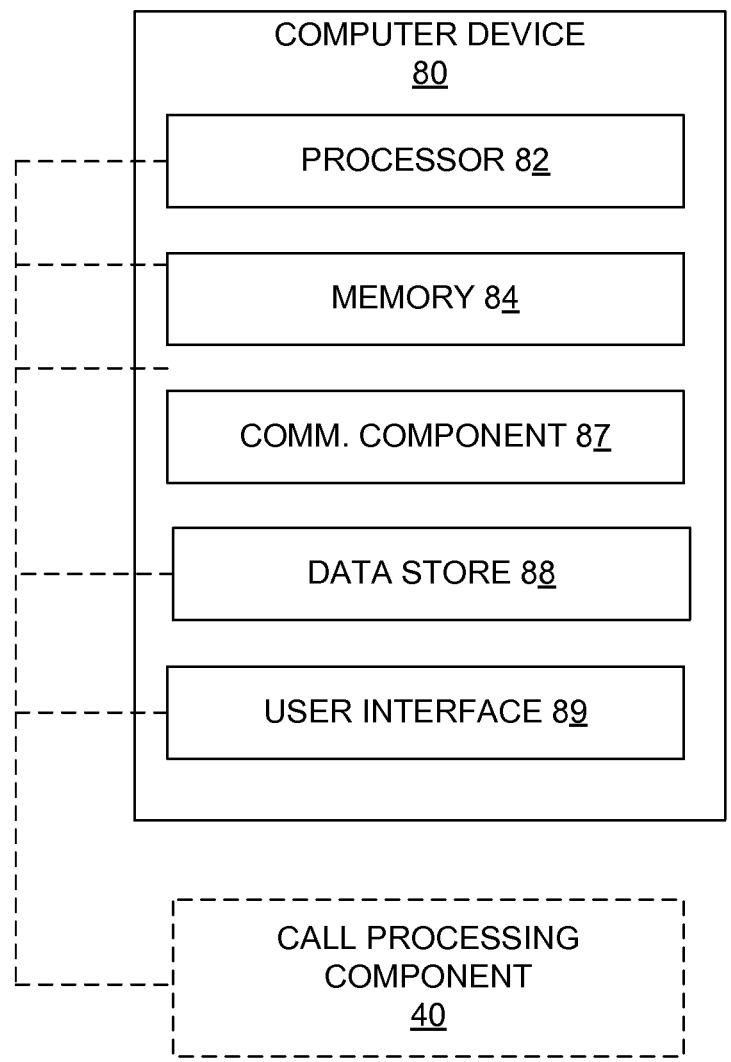
FIG. 7 is a block diagram illustrating additional example components of an aspect of a computer device having a call processing component according to some embodiments.

Referring to FIG. 7, in one aspect, UE 14 and/or wireless serving node 16 of FIGS. 1 and/or 2 may be represented by a specially programmed or configured computer device 80, wherein the special programming or configuration includes call processing component 40, as described herein. For example, for implementation as UE 14 (FIG. 2), computer device 80 may include one or more components for computing and transmitting frames 52 from a UE 14 to network 12 via wireless serving node 16, such as in specially programmed computer readable instructions or code, firmware, hardware, or some combination thereof. Computer device 80 includes a processor 82 for carrying out processing functions associated with one or more of components and functions described herein. Processor 82 can include a single or multiple set of processors or multi-core processors. Moreover, processor 82 can be implemented as an integrated processing system and/or a distributed processing system.

Computer device 80 further includes a memory 84, such as for storing data used herein and/or local versions of applications being executed by processor 82. Memory 84 can include any type of memory usable by a computer, such as random access memory (RAM), read only memory (ROM), tapes, magnetic discs, optical discs, volatile memory, non-volatile memory, and any combination thereof.

Further, computer device 80 includes a communications component 86 that provides for establishing and maintaining communications with one or more parties utilizing hardware, software, and services as described herein. Communications component 86 may carry communications between components on computer device 80, as well as between computer device 80 and external devices, such as devices located across a communications network and/or devices serially or locally connected to computer device 80. For example, communications component 86 may include one or more buses, and may further include transmit chain components and receive chain components associated with a transmitter and receiver, respectively, or a transceiver, operable for interfacing with external devices. For example, in an aspect, a receiver of communications component 86 operates to receive one or more frames 52 via a wireless serving node 16, which may be a part of memory 84. Also, for example, in an aspect, a transmitter of communications component 86 operates to transmit frames 52 from UE 14 to a network 12 via a wireless serving node 16 over link 25.

Additionally, computer device 80 may further include a data store 88, which can be any suitable combination of hardware and/or software, that provides for mass storage of information, databases, and programs employed in connection with aspects described herein. For example, data store 88 may be a data repository for applications not currently being executed by processor 82.

Computer device 80 may additionally include a user interface component 89 operable to receive inputs from a user of computer device 80, and further operable to generate outputs for presentation to the user. User interface component 89 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 89 may include one or more output devices, including but not limited to a display, a speaker, a haptic feedback mechanism, a printer, any other mechanism capable of presenting an output to a user, or any combination thereof.

Furthermore, computer device 80 may include, or may be in communication with, call processing component 40, which may be configured to perform the functions described herein.

Figure 8:
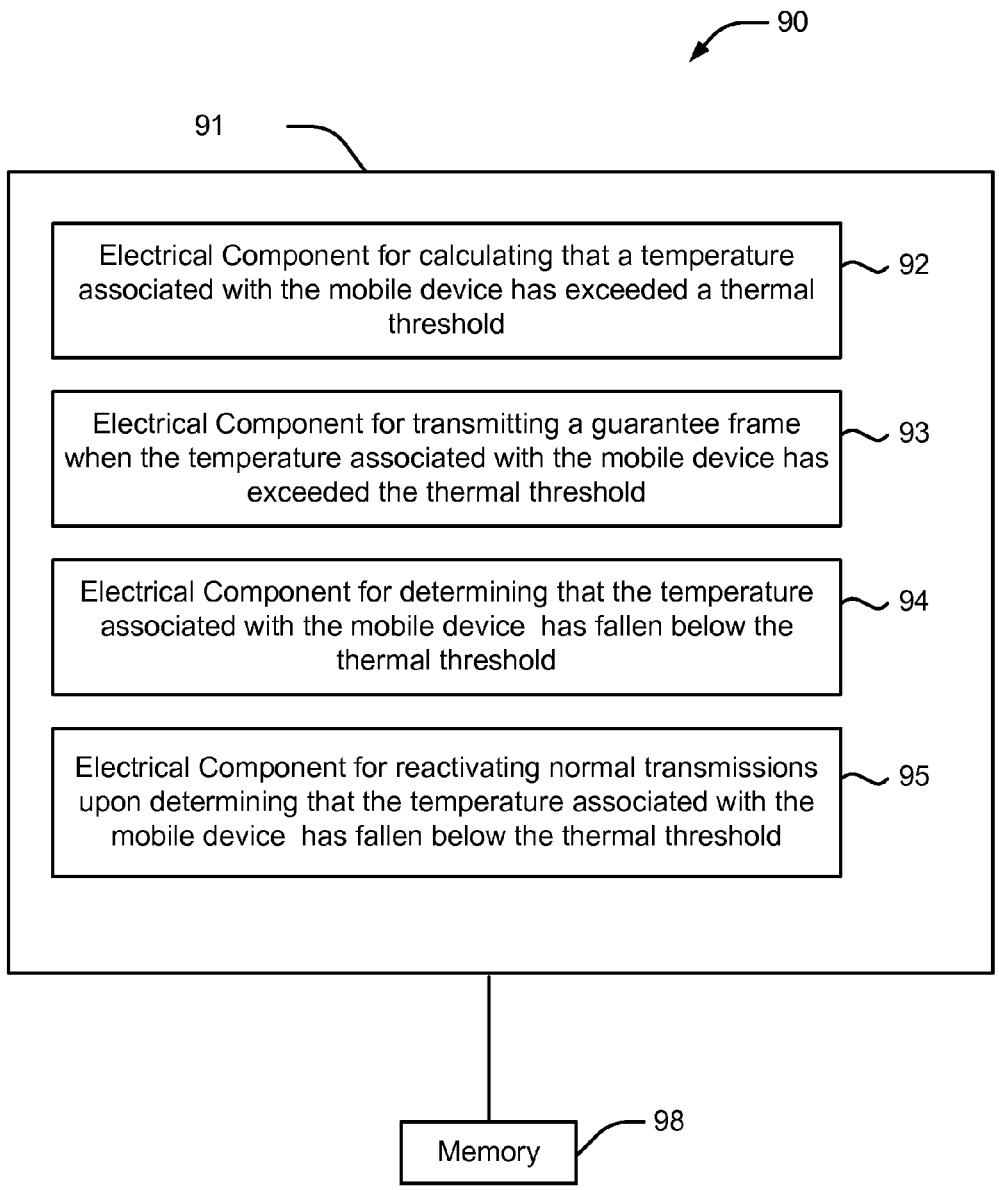
FIG. 8 is a component diagram illustrating aspects of a logical grouping of electrical components according to some embodiments.

Referring to FIG. 8, an example system 90 is displayed for transmitting vast amount of data from a mobile device to a network. For example, system 90 can reside at least partially within UE 14 of FIGS. 1 and 2. It is to be appreciated that system 90 is represented as including functional blocks, which can be functional blocks that represent functions implemented by a processor, software, or combination thereof (e.g., firmware). For example, system 90 may be implemented via processor 82, memory 84, communications component 86, and data store 88 of FIG. 4, by for example, processor 82 executing software stored by memory 84 and/or data store 88.

Example system 90 includes a logical grouping 91 of electrical components that can act in conjunction. For instance, logical grouping 91 can include an electrical component 92 for calculating that a temperature associated with the mobile device has exceeded a thermal threshold. In an aspect, electrical component 92 may include temperature calculating component 42 (FIG. 2).

Additionally, logical grouping 91 can include an electrical component 93 for transmitting a guarantee frame when the temperature associated with the mobile device has exceeded the thermal threshold. In an aspect, electrical component 93 may include transmitting (Tx) component 43 (FIG. 2).

In an additional aspect, logical grouping 91 can include an electrical component 94 for increasing a transmission length of a CRC field. In an aspect, electrical component 94 may include determining that the temperature associated with the mobile device has fallen below the thermal threshold (FIG. 2). In an aspect, electrical component 94 may include temperature determining component 44 (FIG. 2).

Logical grouping 91 can include an electrical component 95 for reactivating normal transmissions upon determining that the temperature associated with the mobile device has fallen below the thermal threshold. In an aspect, electrical component 94 may include reactivating component 45 (FIG. 2).

Electrical components 92-95 may correspond to one or more components in FIG. 2, and such components may be separate physical components, components implemented by processor 32 (FIG. 4), or a combination thereof.

Additionally, system 90 can include a memory 98 that retains instructions for executing functions associated with the electrical components 92-95, stores data used or obtained by the electrical components 92-95, etc. While shown as being external to memory 98, it is to be understood that one or more of the electrical components 92-95 can exist within memory 98. In one example, electrical components 92-95 can comprise at least one processor, or each electrical component 92-95 can be a corresponding module of at least one processor. Moreover, in an additional or alternative example, electrical components 92-95 can be a computer program product including a computer readable medium, where each electrical component 92-95 can be corresponding code.

Figure 9:
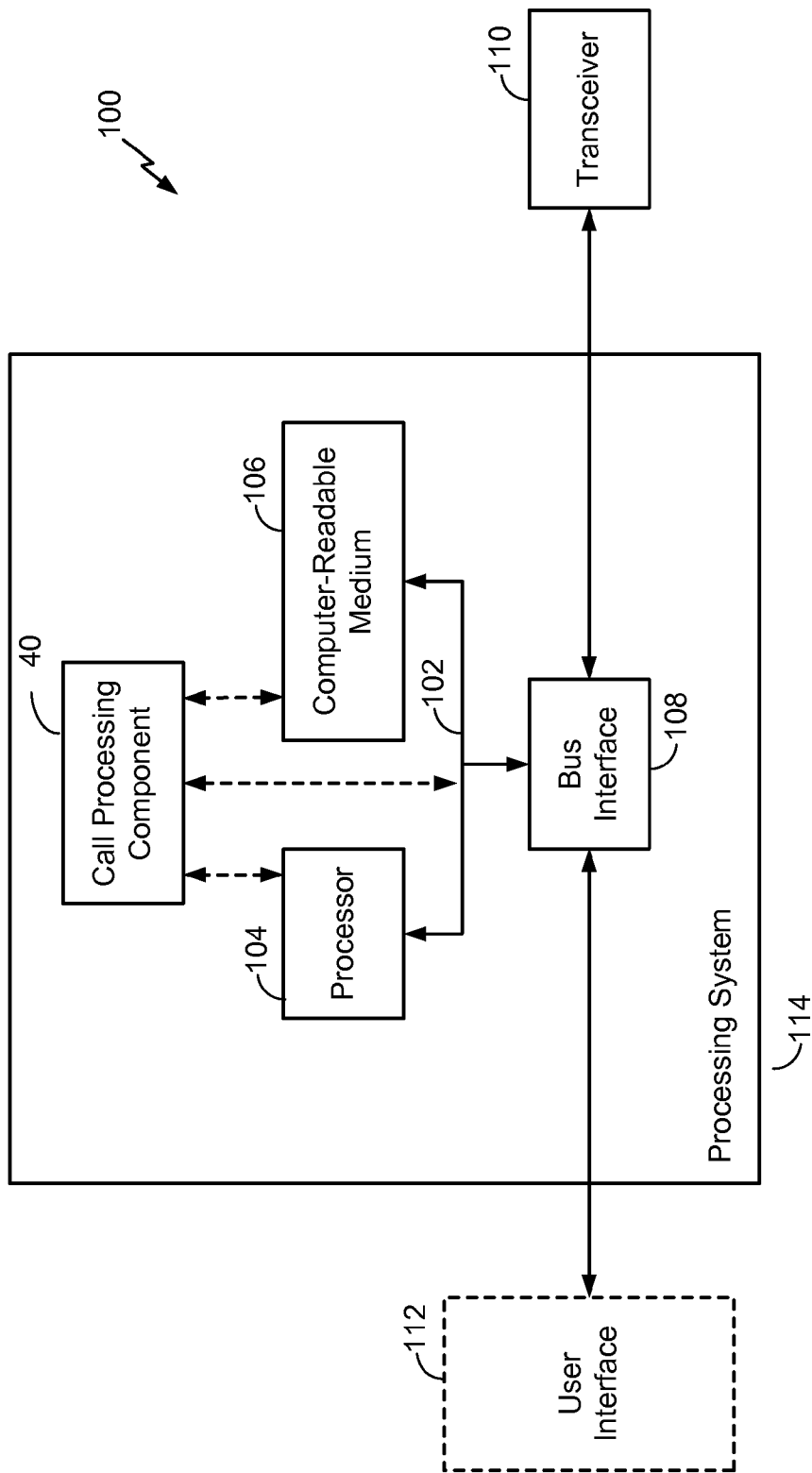
FIG. 9 is a block diagram illustrating an example of a hardware implementation for an apparatus employing a processing system to perform the functions described herein according to some embodiments.

FIG. 9 is a block diagram illustrating an example of a hardware implementation for an apparatus 100 employing a processing system 114. Apparatus 100 may be configured to include, for example, wireless communication system 10 (FIG. 1) and/or call processing component 40 (FIG. 1) implementing the components described above, such as, but not limited to the temperature calculating component 42, transmitting (Tx) component 43, temperature determining component 44, and reactivating component 45, as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, processor 104, computer-readable medium 106, or a combination of both may be configured or otherwise specially programmed to perform the functionality of the call processing component 40 (FIG. 1) as described herein.

The various concepts presented throughout this disclosure may be implemented across a broad variety of telecommunication systems, network architectures, and communication standards.

Figure 10:
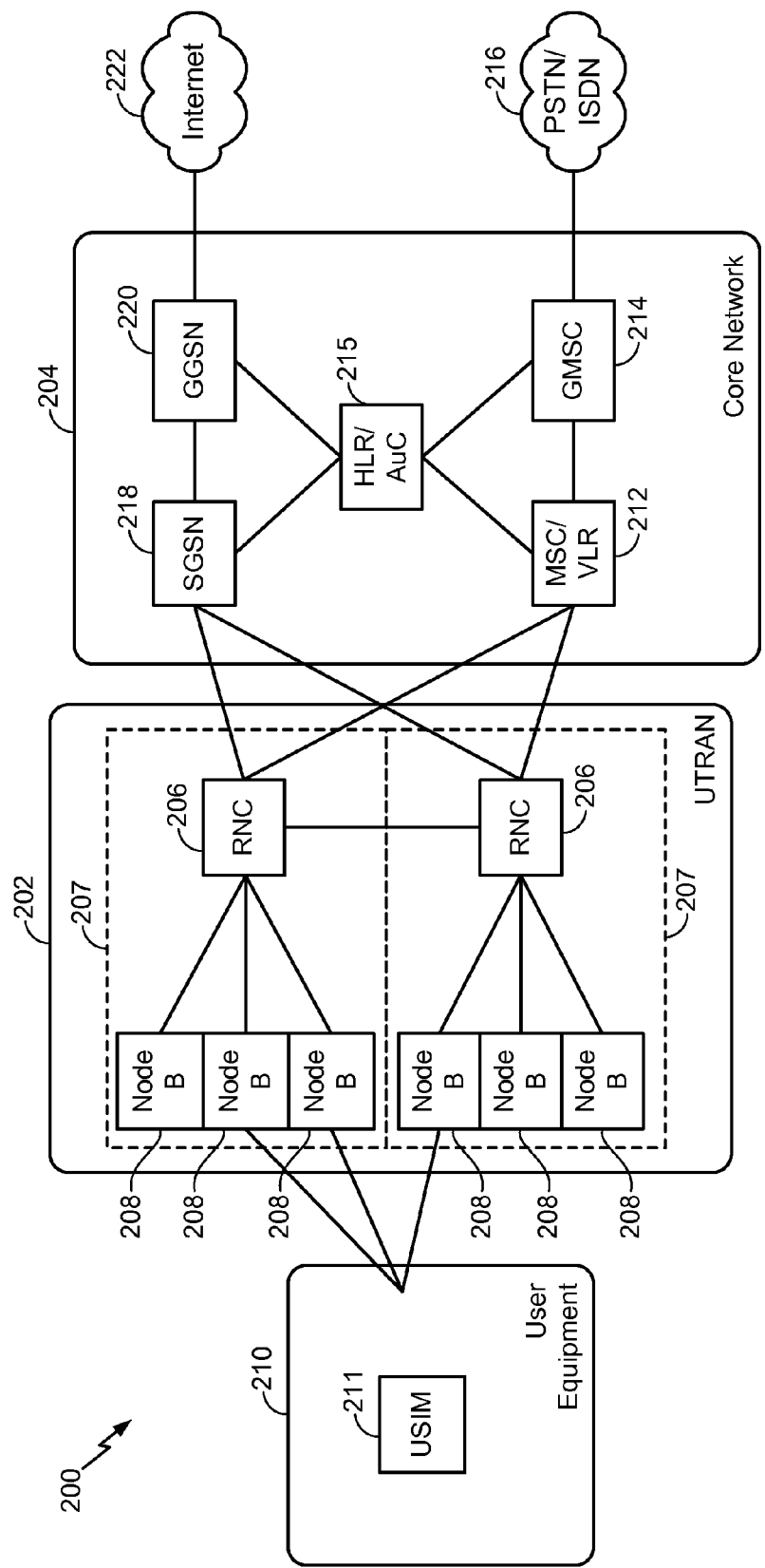
FIG. 10 is a block diagram conceptually illustrating an example of a telecommunications system including a UE configured to perform the functions described herein according to some embodiments.

Referring to FIG. 10, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, the call processing component 40 (FIG. 1) implementing the components described above, such as, but not limited to the temperature calculating component 42, transmitting (Tx) component 43, temperature determining component 44, and reactivating component 45, as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214.

In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 11:
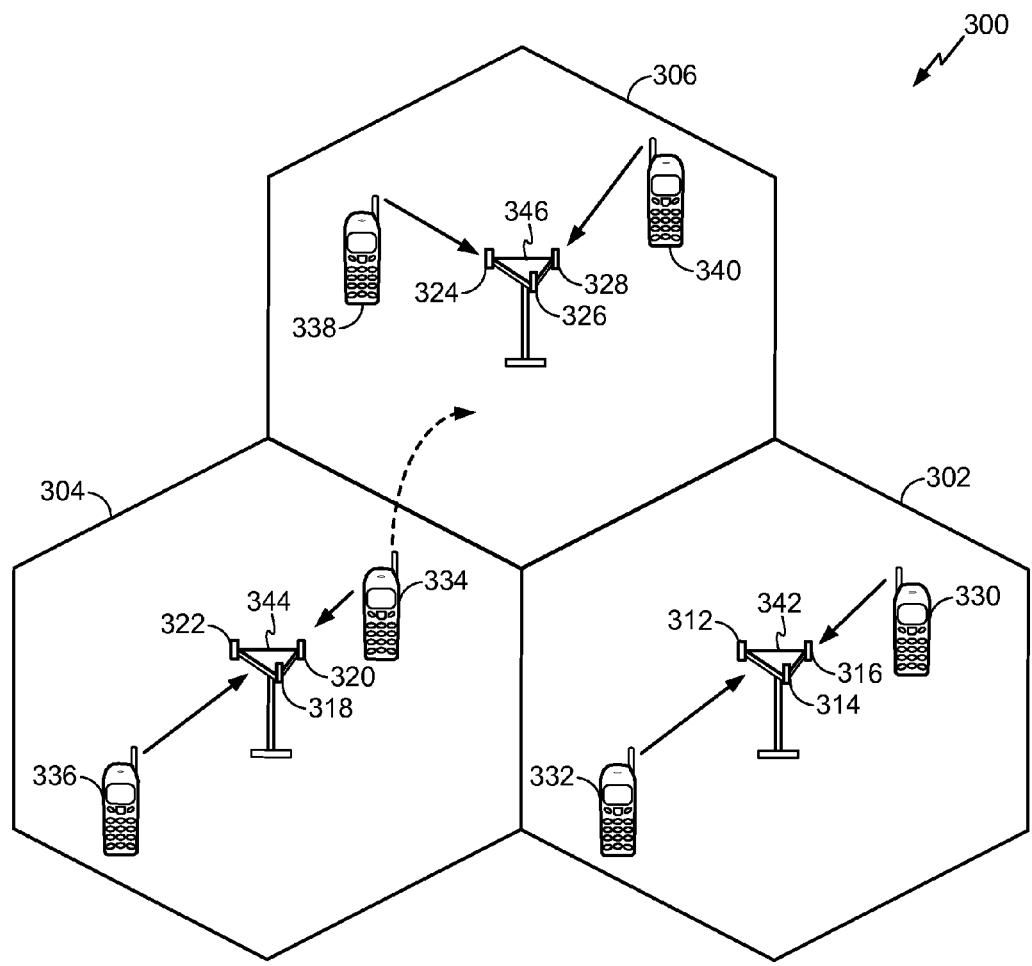
FIG. 11 is a conceptual diagram illustrating an example of an access network for use with a UE configured to perform the functions described herein according to some embodiments.

Referring to FIG. 11, an access network 300 in UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306. Node Bs 342, 344, 346 and UEs 330, 332, 334, 336, 338, 340 respectively may be configured to include, for example, the call processing component 40 (FIG. 1) implementing the components described above, such as, but not limited to the temperature calculating component 42, transmitting (Tx) component 43, temperature determining component 44, and reactivating component 45, as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 12.

Figure 12:
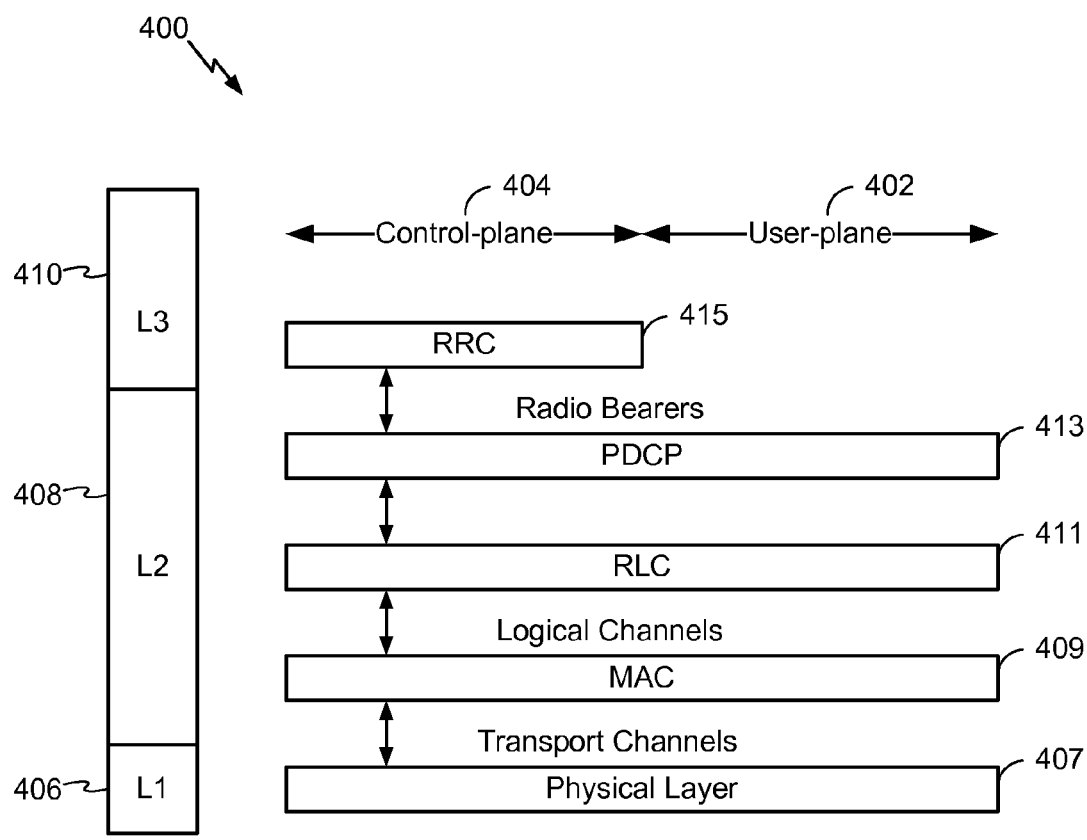
FIG. 12 is a conceptual diagram illustrating an example of a radio protocol architecture for the user and control planes for a base station and/or a UE configured to perform the functions described herein according to some embodiments.

FIG. 12 is a conceptual diagram illustrating an example of the radio protocol architecture 400 for the user plane 402 and the control plane 404 of a user equipment (UE) or node B/base station. For example, architecture 400 may be included in a network entity and/or UE such as an entity within network 12 and/or UE 14 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 13:
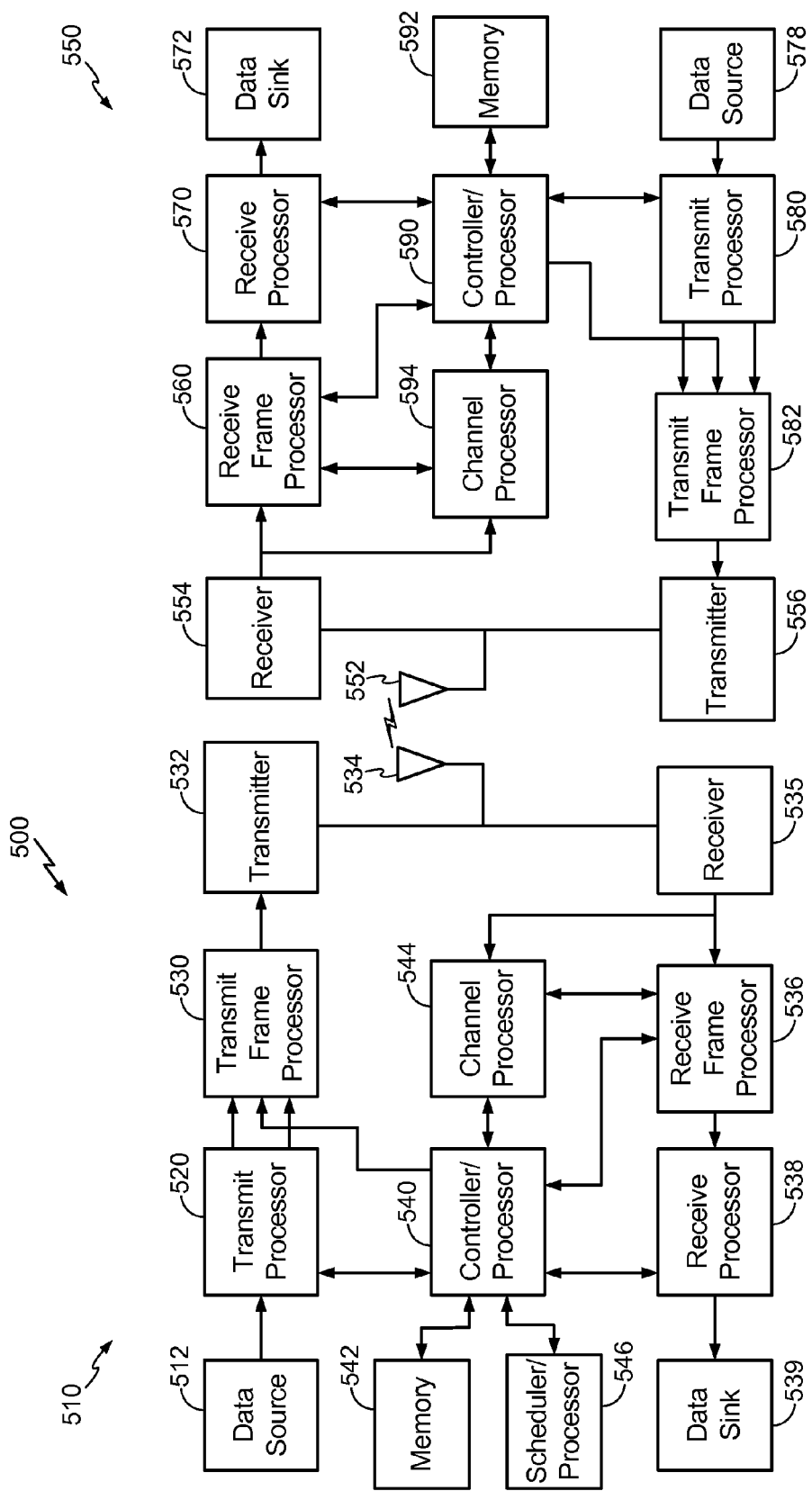
FIG. 13 is a block diagram conceptually illustrating an example of a Node B in communication with a UE in a telecommunications system configured to perform the functions described herein according to some embodiments.

FIG. 13 is a block diagram of a communication system 500 including a Node B 510 in communication with a UE 550, where Node B 510 may be an entity within network 12 and the UE 550 may be UE 14 according to the aspect described in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 7 or 9) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106 (FIG. 9). The computer-readable medium 106 (FIG. 9) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The order or the methods disclosed is an illustration of exemplary processes. Based upon design preferences, the specific order may be rearranged. The accompanying method claims present elements in a sample order, and are not meant to be limited to the specific order unless specifically recited.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method for thermal mitigation in a mobile device, comprising:
   determining that a temperature associated with the mobile device has exceeded a thermal threshold;
   in response to a determination that the temperature associated with the mobile device has exceeded the thermal threshold,
      deactivating a transmission of voice frames for a call by the mobile device, and
      transmitting a frame from a set of frames different from the voice frames and configured to maintain the call when the transmission of voice frames is deactivated;

determining that the temperature associated with the mobile device has fallen below the thermal threshold; and reactivating the transmission of voice frames for the call in response to a determination that the temperature associated with the mobile device has fallen below the thermal threshold.

2. The method of claim 1, wherein the transmission of the frame is performed in place of a transmission back-off and transmission shutdown.

3. The method of claim 1, wherein the frame is a critical frame transmitted by the mobile device to a network.

4. The method of claim 1, wherein the frame is transmitted when a Code Division Multiple Access (CDMA) data transmission is switched on so that the call is maintained.

5. The method of claim 4, wherein the CDMA data transmission comprises a CDMA 1x transmission or a CDMA 1xA transmission.

6. A mobile device, comprising:
   at least one processor; and
   a memory couple to the at least one processor, wherein the at least one processor is configured to:
      determine that a temperature associated with the mobile device has exceeded a thermal threshold;
      in response to a determination that the temperature associated with the mobile device has exceeded the thermal threshold,
         deactivate a transmission of voice frames for a call by the mobile device, and
         transmit a frame from a set of frames different from the voice frames and configured to maintain the call when the transmission of voice frames is deactivated;
      determine that the temperature associated with the mobile device has fallen below the thermal threshold; and
      reactivate the transmission of voice frames for the call in response to a determination that the temperature associated with the mobile device has fallen below the thermal threshold.

7. The apparatus of claim 6, wherein the transmission of the frame is performed in place of a transmission back-off and transmission shutdown.

8. The apparatus of claim 6, wherein the frame is a critical frame transmitted by the mobile device to a network.

9. A mobile device, comprising:
   means for determining that a temperature associated with the mobile device has exceeded a thermal threshold;
   means for, in response to a determination that the temperature associated with the mobile device has exceeded the thermal threshold,
      deactivating a transmission of voice frames for a call by the mobile device, and
      transmitting a frame from a set of frames different from the voice frames and configured to maintain the call when the transmission of voice frames is deactivated;
   means for determining that the temperature associated with the mobile device has fallen below the thermal threshold; and
   means for reactivating the transmission of voice frames for the call upon determining that the temperature associated with the mobile device has fallen below the thermal threshold.

10. The apparatus of claim 9, wherein the transmission of the frame is performed in place of a transmission back-off and transmission shutdown.

11. The apparatus of claim 9, wherein the frame is a critical frame transmitted by the mobile device to a network.

12. A a non-transitory computer-readable medium storing executable code comprising:
   code for determining that a temperature associated with the mobile device has exceeded a thermal threshold;
   in response to a determination that the temperature associated with the mobile device has exceeded the thermal threshold,
      code for deactivating a transmission of voice frames for a call by the mobile device, and
      code for transmitting a frame from a set of frames different from the voice frames and configured to maintain the call when the transmission of voice frames is deactivated;
   code for determining that the temperature associated with the mobile device has fallen below the thermal threshold; and
   code for reactivating the transmission of voice frames for the call upon determining that the temperature associated with the mobile device has fallen below the thermal threshold.

13. The computer-readable medium of claim 12, wherein the transmission of the frame is performed in place of a transmission back-off and transmission shutdown.

14. The computer-readable medium of claim 12, wherein the frame is a critical frame transmitted by the mobile device to a network.

\* \* \* \* \*